US012809641B2

(12) United States Patent
Bilal et al.

(10) Patent No.: US 12,809,641 B2
(45) Date of Patent: Nov. 24, 2026

(54) SELECTING OPTIMAL HARDWARE CONFIGURATIONS

(71) Applicant: Databricks, Inc., San Francisco, CA (US)

(72) Inventors: Ahmed Bilal, Sammamish, WA (US); Steven Yikun Chen, San Francisco, CA (US); Bruce Laurent Fontaine, Sunnyvale, CA (US); Daya Shanker Khudia, Fremont, CA (US); Chenran Li, Mountain View, CA (US); Ankit Mathur, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 423 days.

(21) Appl. No.: 18/527,111

(22) Filed: Dec. 1, 2023

(65) Prior Publication Data

US 2025/0181358 A1 Jun. 5, 2025

(51) Int. Cl.
*G06F 9/445* (2018.01)

(52) U.S. Cl.
CPC ................................ *G06F 9/44505* (2013.01)

(58) Field of Classification Search
None
See application file for complete search history.

(56) References Cited

U.S. PATENT DOCUMENTS

2023/0229938 A1* 7/2023 Mariano ................. G06F 9/547 706/10
2023/0421350 A1* 12/2023 Soceanu ................. G06F 30/20
2024/0192946 A1* 6/2024 Vijaywargiya ............ G06F 8/63
2024/0244104 A1* 7/2024 Venkataraghavan ..... G06F 8/60
2025/0021837 A1* 1/2025 He ........................... G06N 5/01
2025/0030759 A1* 1/2025 Bhatnagar ........... H04L 67/1008
2025/0085981 A1* 3/2025 Agrawal ................... G06F 8/60
2025/0141470 A1* 5/2025 Kalkunte ............ H03M 7/6058

* cited by examiner

*Primary Examiner* — Wynuel S Aquino
(74) *Attorney, Agent, or Firm* — Fenwick & West LLP

(57) ABSTRACT

A data processing service builds a container for a customer to run a trained large language model (LLM). The data processing service receives a trained LLM and a desired configuration from a user of a client device. Based on the desired configuration, the data processing service selects a hardware configuration and structures weights of the trained LLM based on the hardware configuration. The data processing service generates a container image reflecting the hardware configuration, registers the container image to a container registry, and generates a container from the container image as well as an application programming interface (API) endpoint for the container. The data processing service deploys the trained LLM in the API endpoint using the container such that the trained LLM is accessible through API calls.

20 Claims, 6 Drawing Sheets

SELECTING OPTIMAL HARDWARE CONFIGURATIONS

TECHNICAL FIELD

The disclosed configuration relates generally to deploying large language models, and more particularly to selecting hardware configurations for processing large language models.

BACKGROUND

Open-source large language models (OSS LLMs) are desirable options when it comes to performing language processing tasks. OSS LLMs allow users to fine-tune preexisting models with their own data, saving both time and cost associated with developing and training a model from scratch while also tailoring models to specific use-cases. However, running OSS LLMs can be time-intensive. Moreover, optimizing the hardware configurations that run OSS LLMs is often a difficult manual process that requires technical expertise.

SUMMARY

A data processing service automatically builds an executable software container for a user to run a trained large language model (LLM) with an optimized hardware configuration. The data processing service receives a trained LLM and a desired configuration from a user of a client device. Based on the desired configuration, the data processing service selects a hardware configuration and structures weights of the trained LLM based on the hardware configuration. The data processing service generates an image for a container (or container image) that reflects the hardware configuration. The container image is registered in a container registry. The data processing service generates a container from the container image in addition to an application programming interface (API) endpoint for the container. The data processing service deploys the trained LLM in the API endpoint using the container such that the trained LLM is accessible through API calls.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

Figure (FIG.) 1 is a high-level block diagram of a system environment for a data processing service, in accordance with an embodiment.

DETAILED DESCRIPTION

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
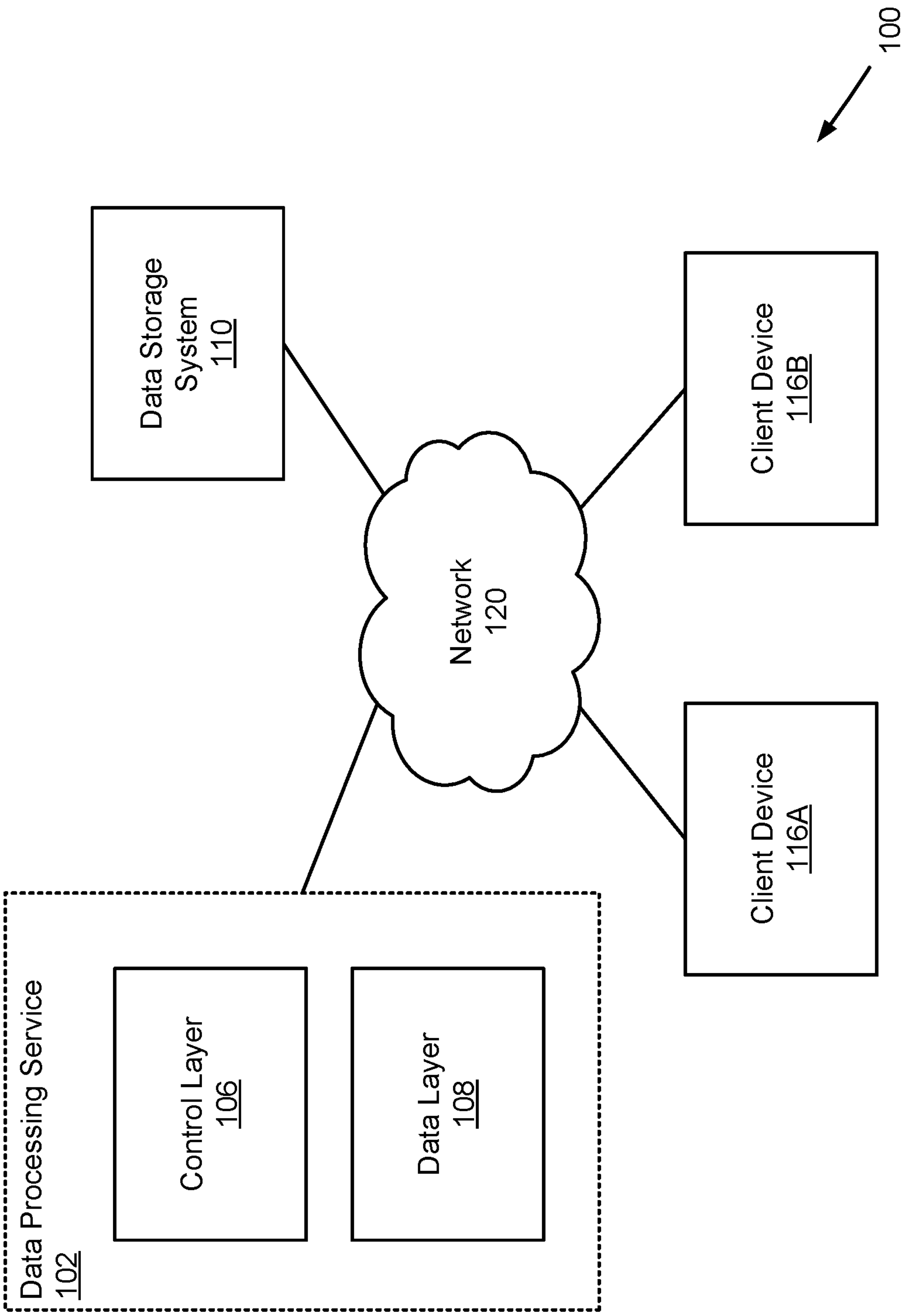

Figure (FIG.) 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100. The computing systems of the system environment 100 may include some or all of the components (systems (or subsystems)) of a computer system 600 as described with FIG. 6.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data storage system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client devices 116 of the system environment 100 may include some or all of the components (systems (or subsystems)) of a computer system 600 as described with FIG. 6.

In one embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™.

Figure 2:
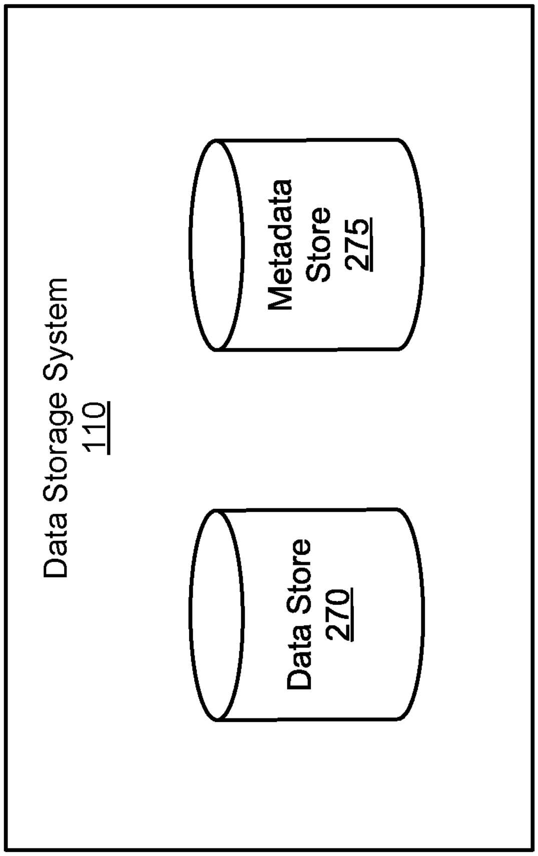
FIG. 2 illustrates a block diagram of an architecture of a data storage system, in accordance with an embodiment.

FIG. 2 is a block diagram of an architecture of a data storage system 108, in accordance with an embodiment. The data layer 108 includes a data store 270 and a metadata store 275.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 108. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

Figure 3:
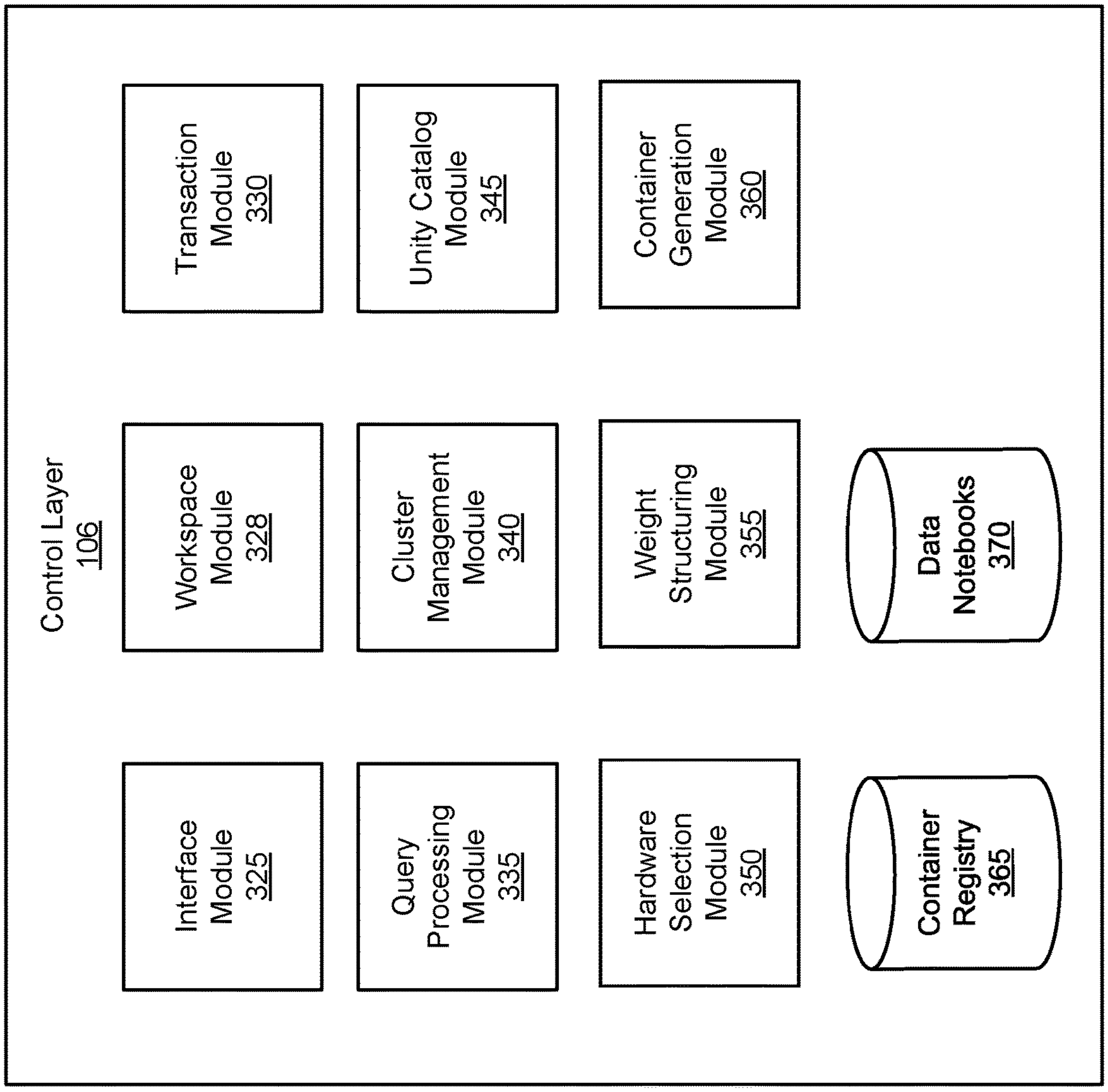
FIG. 3 illustrates a block diagram of an architecture of a control layer, in accordance with an embodiment.

FIG. 3 is a block diagram of an architecture of a control layer 106, in accordance with an embodiment. In one embodiment, the control layer 106 includes an interface module 325, a workspace module 328, a transaction module 330, a query processing module 335, a cluster management module 340, a unity catalog module 345, a hardware selection module 350, a weight structuring module 355, and a container generation module 360. The control layer 106 also includes a container registry 365 and a data notebook store 370. The modules 325, 328, 330, 335, 340, 345, 350, 355, and 360 may be structured for execution by a computer system, e.g., 600 having some or all of the components as described in FIG. 6, such that the computer system 600 operates in a specified manner as per the described functionality.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the interface module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

In some embodiments, the interface module 325 provides an interface for users to make requests to build optimized hardware configurations for trained LLMs. Along with a trained LLM, a user may input a desired configuration, including a cost threshold, whether the hardware configuration should be batch optimized or latency optimized, and any associated batch or latency requirements. The interface module 325 may allow users to make API requests to API endpoints where the data layer 108 deploys the trained LLM.

The workspace module 328 deploys workspaces within the data processing service 102. A workspace as defined herein may refer to a deployment in the cloud that functions as an environment for users of the workspace to access assets. An account of the data processing service 102 represents a single entity that can include multiple workspaces. In one embodiment, an account associated with the data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of the data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. The query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108, and receives responses to the queries from clusters in which the queries are executed.

The unity catalog module 345 is a fine-grained governance solution for managing assets within the data processing service 102. It helps simplify security and governance by providing a central place to administer and audit data access. In one embodiment, the unity catalog module 345 maintains a metastore for a respective account. A metastore is a top-level container of objects for the account. The metastore may store data objects and the permissions that govern access to the objects. A metastore for an account can be assigned to one or more workspaces associated with the account. In one embodiment, the unity catalog module 345 organizes data as a three-level namespace, a catalogue is the first layer, a schema (also called a database) is the second layer, and tables and views are the third layer.

In one embodiment, the unity catalog module 345 enables read and write of data to data stored in cloud storage of the data storage system 110 on behalf of users associated with an account and/or workspace. In one instance, the unity catalog module 345 manages storage credentials and external locations. A storage credential represents an authentication and authorization mechanism for accessing data stored on the data storage system 110. Each storage credential may be subject to access-control policies that control which users and groups can access the credential. An external location is an object that combines a cloud storage path (e.g., storage path in the data storage system 110) with a storage credential that authorizes access to the cloud storage path. Each storage location is subject to access-control policies that control which users and groups can access the storage credential. Therefore, if a user does not have access to a storage credential in the unity catalog module 345, the unity catalog module 345 does not attempt to authenticate to the data storage system 110.

In one embodiment, the unity catalog module 345 allows users to share assets of a workspace and/or account with users of other accounts and/or workspaces. For example, users of Company A can configure certain tables owned by Company A that are stored in the data storage system 110 to be shared with users of Company B. Each organization may be associated with separate accounts on the data processing service 102. Specifically, a provider entity can share access to one or more tables of the provider with one or more recipient entities.

Responsive to receiving a request from a provider to share one or more tables (or other data objects), the unity catalog module 345 creates a share in the metastore of the provider. A share is a securable object registered in the metastore for a provider. A share contains tables and notebook files from the provider metastore that the provider would like to share with a recipient. A recipient object is an object that associates an organization with a credential or secure sharing identifier allowing that organization to access one or more shares of the provider. In one embodiment, a provider can define multiple recipients for a given metastore. The unity catalog module 345 in turn may create a provider object in the metastore of the recipient that stores information on the provider and the tables that the provider has shared with the recipient. In this manner, a user associated with a provider entity can securely share tables of the provider entity that are stored in a dedicated cloud storage location in the data storage system 110 with users of a recipient entity by configuring shared access in the metastore.

The hardware selection module 350 receives a trained LLM. The model may be a pre-trained, open source model that a user has selected from a model registry. The model may be fine-tuned by training the weights of the model with the user's own data. As such, the weights of the model may be any custom weights or may be publicly available weights (e.g., weights associated with a pre-trained or open-source model). The model may be registered in a model registry. In receiving the trained LLM, the hardware selection module includes the model's trained weights as well as the model's metadata. The metadata may include information such as the model type (e.g., GPT-3, GPT-4, BERT, Transformer-XL, T5, MPT-30B). The hardware selection module 350 may receive a desired configuration with which to run the trained LLM. The desired configuration may be specified by the user and may include, for example, a cost threshold, whether the hardware configuration should be batch optimized or latency optimized, and/or any associated batch or latency requirements.

The hardware selection module 350 selects a hardware configuration for the received trained LLM based on the model type of the trained LLM and the desired configuration. The hardware selection module 350 may select the hardware configuration from a set of hardware configurations stored in a hardware configuration table. The hardware configuration table may store data such as the maximum batch size, the throughput of the configuration, the memory of the configuration, and the latency of the configuration for a variety of models. Based on the desired configuration, the hardware selection module 350 determines whether the hardware configuration should be batch optimized or latency optimized.

In response to determining that the hardware configuration should be batch optimized, the hardware selection module 350 determines a hardware configuration in the hardware configuration table that has the highest throughput for the model type of the trained LLM. For example, for a trained LLM of the BERT model type, the hardware selection module 350 may determine that an A100 80 GB SMX4 GPU hardware configuration has the highest throughput for the model, a throughput of 32 samples per second. The hardware selection module 350 computes the expected price per hour of the selected hardware configuration based on pricing stored in a pricing table and compares the expected price per hour to the cost threshold of the desired configuration. In response to the expected price per hour exceeding the cost threshold, the hardware selection module 350 may determine the hardware configuration that has the next highest throughput for the model type. The hardware selection module 350 may repeat the process until it has determined a hardware configuration with the highest throughput that has an expected price per hour less than the cost threshold. In some embodiments, the hardware selection module 350 may determine a set of hardware configurations that have the highest throughput and satisfy the cost threshold requirement (e.g., a set of hardware configurations with the three highest throughputs). In these embodiments, the hardware selection module 350 may determine which of the set of hardware configurations best satisfy the latency requirements of the desired configuration. In some embodiments, especially when the desired configuration includes that the hardware configuration be batch optimized, the hardware selection module 350 may consider the memory of each configuration. For example, the hardware selection module 350 may select a GPU with high memory so more requests may be included within a batch or more batches may be processed at the same time.

In response to determining that the hardware configuration should be latency optimized, the hardware selection module 350 determines a hardware configuration in the hardware configuration table that has the lowest latency while having an expected price per hour that does not exceed the cost threshold. In some embodiments, the hardware configuration table may not have the latency of a hardware configuration for the model type of the trained LLM. The hardware selection module 350 may simulate the expected latency for a hardware configuration using pre-existing benchmarks for the hardware configuration.

In some embodiments, the desired configuration may include an estimated queries per second (QPS) of the trained LLM, and the hardware selection module 350 may select the hardware configuration based on the QPS. For example, for a low expected QPS, the hardware selection module 350 may select a hardware configuration with a lower cost (price per hour) and create more container instances if the QPS rises. For a high expected QPS, the hardware selection module 350 may select a hardware configuration with a higher cost (though still below the cost threshold) to prevent the need to increase the number of containers in the future. In some embodiments, the hardware selection module 350 may not be able to satisfy all the requirements of the desired configuration. In these embodiments, the hardware selection module 350 may default to satisfying the cost requirement, compromising on the latency or batch requirements.

In some embodiments, the hardware selection module 350 may select a batching configuration for the trained LLM. The batching configuration may include how many input sequences the trained LLM may process at the same time. The hardware selection module 350 may select a batching configuration that allows more input sequences to be processed together to increase the throughput of the trained LLM (e.g., if the desired configuration is batch optimized). The hardware selection module 350 may select a batching configuration that allows less input sequences to be processed together to reduce latency (e.g., if the desired configuration is latency sensitive). In some embodiments, the hardware selection module 350 may select a batching configuration by running a benchmark test on an API endpoint to identify an optimal batching configuration. The API endpoint is described with respect to the data layer 108.

In some embodiments, the hardware selection module 350 may quantize the trained LLM. Quantizing a model involves converting the weights of the model from high-precision representations (e.g., floating point) to lower-precision representations (e.g., floating point or integer). For example, quantization may involve converting the weights of the model from 32-bit floating point representations to 8-bit integer representations. To quantize the trained LLM, the hardware selection module 350 receives the trained LLM and a desired level of precision to achieve in the quantization process. The hardware selection module 350 quantizes the trained LLM to have the desired level of precision. In some embodiments, the hardware selection module 350 may display the results of quantization to a user of the client device 116. In quantizing the trained LLM, the hardware selection module 350 reduces the size of the model, reducing latency and memory requirements.

The weight structuring module 355 structures the weights of the trained LLM based on the hardware configuration selected by the hardware selection module 350. For example, if the hardware selection module 350 selects a hardware configuration of four GPUs, the weight structuring module 355 may split the weights into four files that can individually be loaded into each of the four GPUs. The weight structuring module 355 may structure the weights by using a model parallelism technique, where the weight structuring module 355 splits the layers or parameters of the trained LLM across multiple GPUs. In some embodiments, the weight structuring module 355 may use pipeline parallelism, partitioning the set of layers of the trained LLM across the GPUs of the hardware configuration. In using this method, the weight structuring module 355 partitions the sets of weights, not the weights themselves. In some embodiments, the weight structuring module 355 may use tensor parallelism, splitting individual layers of the trained LLM across GPUs of the hardware configuration. In using this method, the weight structuring module 355 may split the weights themselves.

The container generation module 360 generates a container image reflecting the hardware configuration selected by the hardware selection module 350. For example, for a hardware configuration of four GPUs, the container generation module 360 may generate a container image such that four GPU units of a computing host (e.g., client device 116) can be allocated to an instance of the container image. The container image may include other components required to deploy the trained LLM, for example code, runtime, libraries, environment variables, and configuration files. The runtime may be optimized to work well for the model type of the trained LLM or the hardware configuration. The container generation module 360 registers the generated container image to the container registry 365. The container generation module 360 provides the container images in the container registry 365 to the data layer 108.

The data layer 108 receives the container image from the container registry 365 of the control layer 106 and generates one or more containers based on the container image. The data layer 108 generates an API endpoint for each container. The API endpoint enables users of client devices 116 to make requests to the trained LLM using API requests. The data layer 108 may deploy the trained LLM in the API endpoint using the container. In deploying the trained LLM, the data layer 108 makes the trained LLM available to one or more tenants of the data layer 108. For example, in one embodiment the trained LLM may be stored and/or cataloged in a database library for retrieval and/or transmission when ready to be applied (or used). In other example embodiment, the trained LLM may be transmitted for applied immediately and may continuously update while in use. The tenants may use the trained LLM to run inference tasks. In response to receiving an API request from the control layer 106, the data layer 108 identifies a container image on which to process the request. The data layer 108 provides the result of the processed request generated by the container back to the control layer 106.

In some embodiments, the data layer 108 may scale the number of containers up or down as needed. For example, in response to receiving a volume of requests or usage of resources (e.g., memory, GPU, network bandwidth) higher than a threshold, the data layer may deploy additional containers for a container image. In response to receiving a volume of requests or usage of resources below the threshold, the data layer 108 may scale down the number of containers for a container image.

Figure 4:
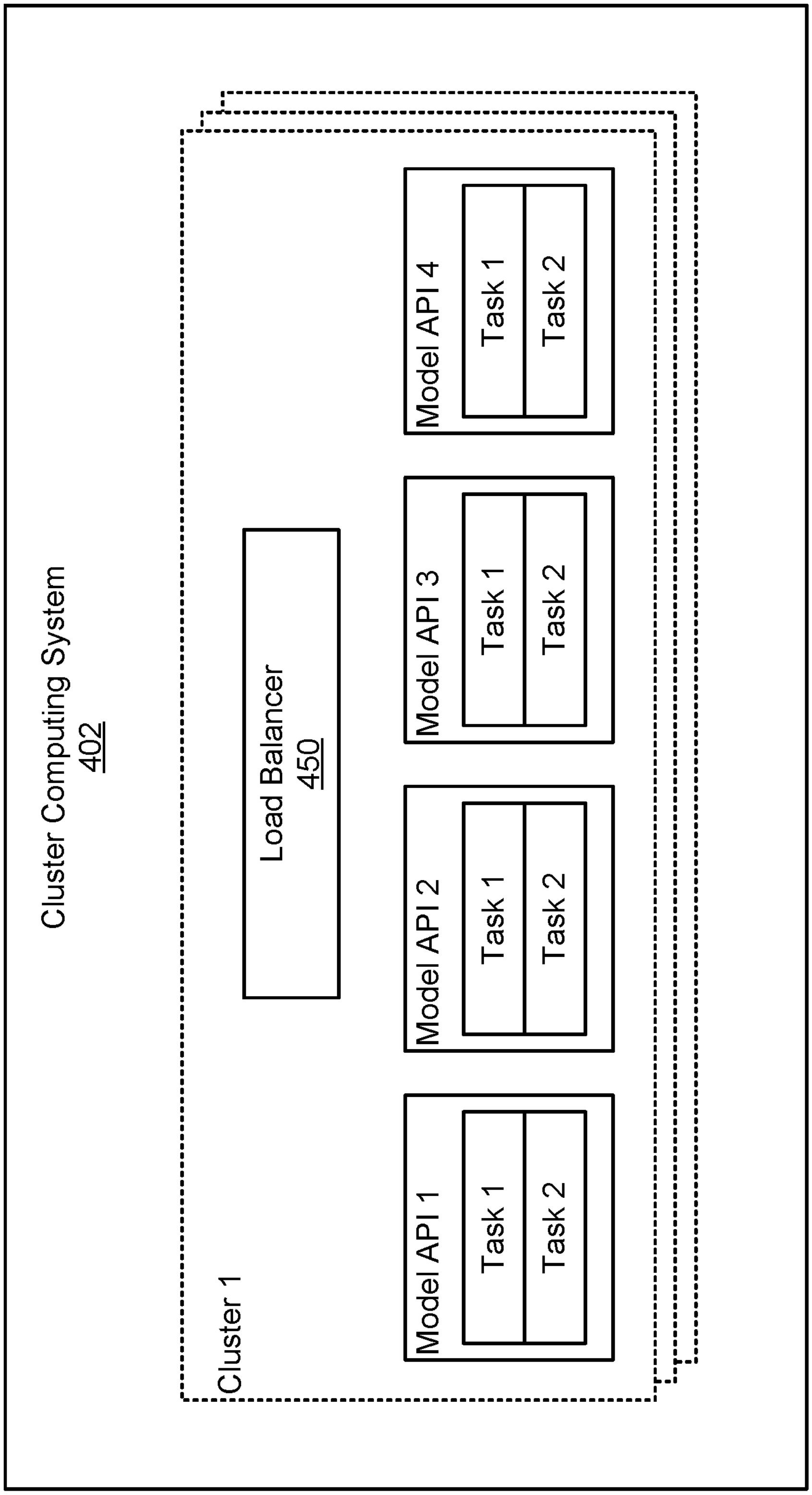
FIG. 4 illustrates a block diagram of an architecture of a cluster computing system of the data layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes load balancer 450 and worker pool including multiple model APIs. The nodes may be structured for execution by a computer system, e.g., 600 having some or all of the components as described in FIG. 6, such that the computer system 600 operates in a specified manner as per the described functionality.

The load balancer 450 receives one or more jobs for execution, divides a job into job stages, and provides job stages to model APIs, receives job stage results from the model APIs of the worker pool, and assembles job stage results into complete job results, and the like. In one embodiment, the driver node receives a request to execute one or more queries from the query processing module 335. The load balancer 450 may compile a database query and generate an execution plan. The load balancer 450 distributes the query information including the generated code to the model APIs. The model APIs execute the query based on the received information.

The worker pool can include any appropriate number of model APIs (e.g., 4 model APIs, 12 model APIs, 256 model APIs). Each model API in the worker pool includes one or more execution engines (not shown) for executing one or more tasks of a job stage. In one embodiment, an execution engine performs single-threaded task execution in which a task is processed using a single thread of the CPU. The model API distributes one or more tasks for a job stage to the one or more execution engines and provides the results of the execution to the load balancer 450. According to an embodiment, a model API executes the generated code for the database query for a particular subset of data that is processed by the database query. The model APIs execute the query based on the received information from the load balancer 450.

Optimized Container Build Process

Figure 5:
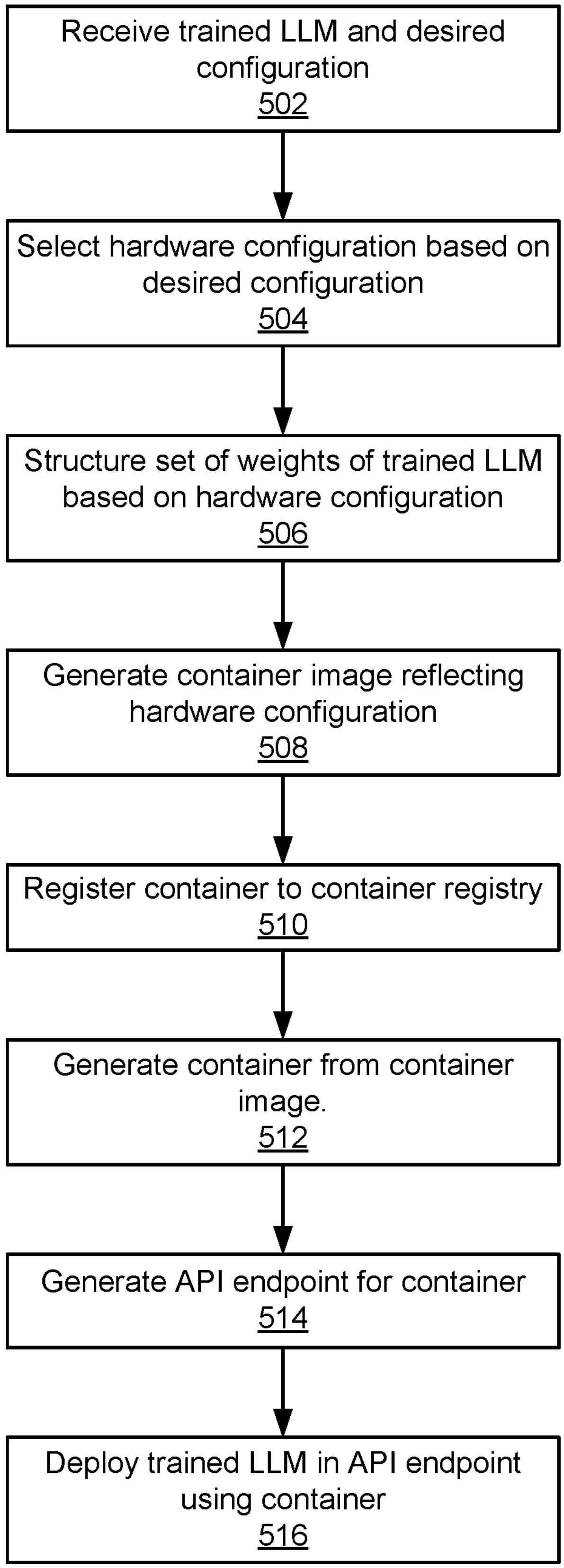
FIG. 5 is a flowchart of a method for building an optimized container to run a large language model, in accordance with an embodiment.

FIG. 5 is a flowchart of a method for building an optimized container to run a large language model, in accordance with an embodiment. The process shown in FIG. 5 may be performed by one or more components (e.g., the control layer 106) of a data processing system/service (e.g., the data processing service 102). Other entities may perform some or all of the steps in FIG. 5. The data processing service 102 as well as the other entities may include some or of the component of the machine (e.g., computer system) described in conjunction with FIG. 6. Embodiments may include different and/or additional steps, or perform the steps in different orders.

The control layer 106 receives 502 a trained LLM and a desired optimization configuration. The control layer 106 may receive the trained LLM and desired optimization configuration from a client device 116. The trained LLM may be an open source model that a user has selected from a model registry and fine-tuned. The desired configuration may include a cost threshold, whether the hardware configuration should be batch optimized or latency optimized, and any associated batch or latency requirements.

The control layer 106 selects 504 a hardware configuration based on the desired optimization configuration. The control layer 106 may select the hardware configuration from a set of hardware configurations stored in a hardware configuration table. The control layer 106 determines whether the hardware configuration should be batch optimized or latency optimized. In response to determining that the hardware configuration should be batch optimized, the control layer 106 determines a hardware configuration in the hardware configuration table that has the highest throughput for the model type of the trained LLM, computes the expected price per hour of the selected hardware configuration based on pricing stored in a pricing table, and compares the expected price per hour to the cost threshold of the desired configuration. In response to the expected price per hour exceeding the cost threshold, the control layer may determine the hardware configuration that has the next highest throughput for the model type, repeating until the expected price per hour does not exceed the cost threshold. In response to determining that the hardware configuration should be latency optimized, the control layer 106 determines a hardware configuration in the hardware configuration table that has the lowest latency while having an expected price per hour that does not exceed the cost threshold.

The control layer 106 structures 506 the set of weights of the trained LLM based on the hardware configuration. The control layer 106 may structure the weights by using a model parallelism technique, splitting the layers or parameters of the trained LLM across multiple GPUs. The control layer 106 may structure the set of weights using pipeline parallelism, tensor parallelism, or any other weight structuring method.

The control layer 106 generates 508 a container image reflecting the hardware configuration, registers 510 the container image to a container registry, and generates 512 a container from the container image to deploy the trained LLM in the container. The data layer 108 generates 514 an API endpoint for the container and deploys 516 the trained LLM in API endpoint using the container.

Figure 6:
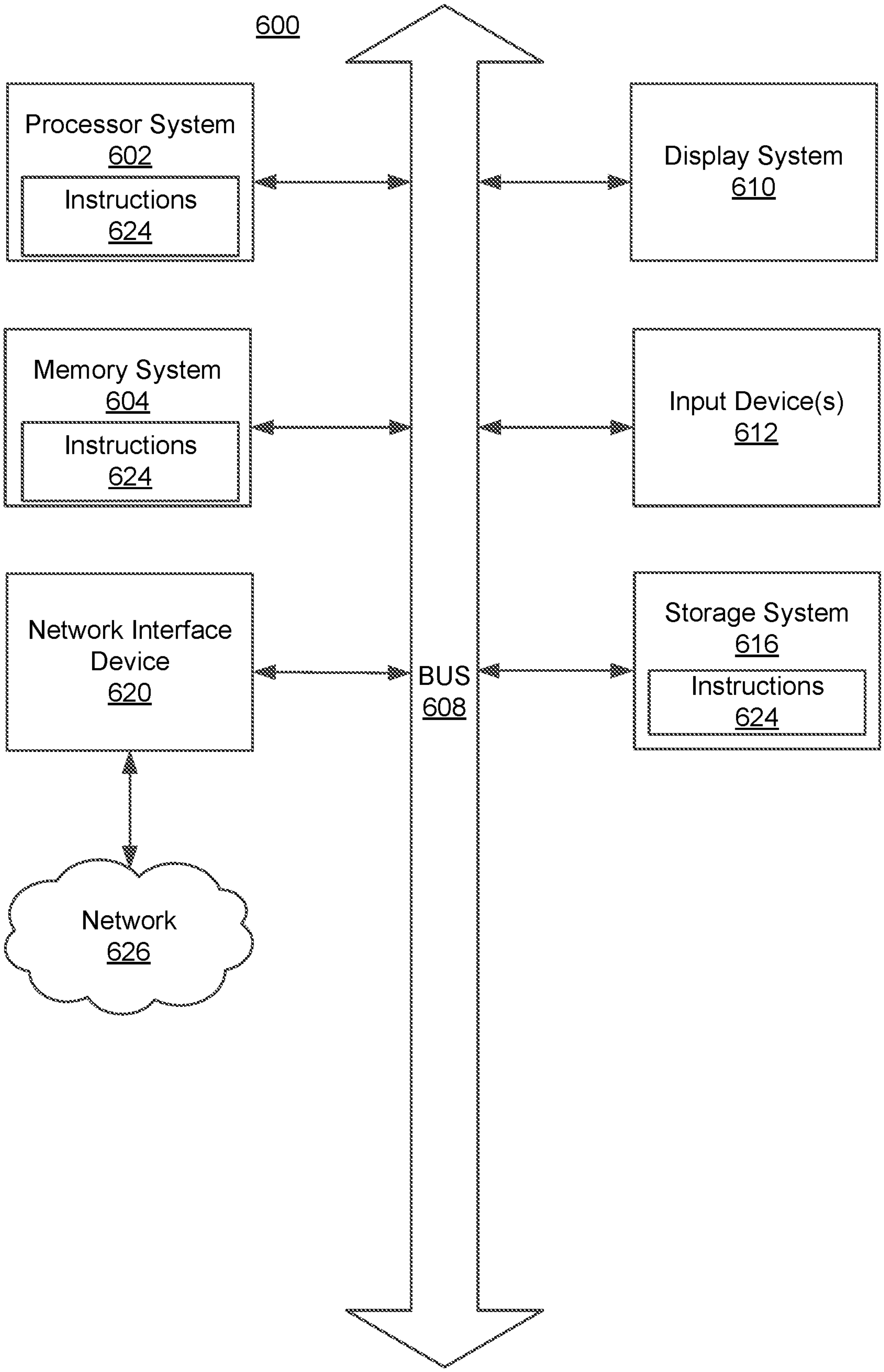
FIG. 6 illustrates a machine to read and execute computer readable instructions, in accordance with an embodiment.

Turning now to FIG. 6, illustrated is an example machine to read and execute computer readable instructions, in accordance with an embodiment. Specifically, FIG. 6 shows a diagrammatic representation of the data processing service 102 (and/or data processing system) in the example form of a computer system 600. The computer system 600 is structured and configured to operate through one or more other systems (or subsystems) as described herein. The computer system 600 can be used to execute instructions 624 (e.g., program code or software) for causing the machine (or some or all of the components thereof) to perform any one or more of the methodologies (or processes) described herein. In executing the instructions, the computer system 600 operates in a specific manner as per the functionality described. The computer system 600 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 600 may be a server computer, a client computer, a personal computer (PC), a tablet PC, a smartphone, an internet of things (IoT) appliance, a network router, switch or bridge, or other machine capable of executing instructions 624 (sequential or otherwise) that enable actions as set forth by the instructions 624. Further, while only a single machine is illustrated, the term "machine" shall also be taken to include any collection of machines that individually or jointly execute instructions 624 to perform any one or more of the methodologies discussed herein.

The example computer system 600 includes a processor system 602. The processor system 602 includes one or more processors. The processor system 602 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor system 602 executes an operating system for the computer system 600. The computer system 600 also includes a memory system 604. The memory system 604 may include or more memories (e.g., dynamic random access memory (RAM), static RAM, cache memory). The computer system 600 may include a storage system 616 that includes one or more machine readable storage devices (e.g., magnetic disk drive, optical disk drive, solid state memory disk drive).

The storage unit 616 stores instructions 624 (e.g., software) embodying any one or more of the methodologies or functions described herein. For example, the instructions 624 may include instructions for implementing the functionalities of the transaction module 330 and/or the query processing module 335. The instructions 624 may also reside, completely or at least partially, within the memory system 604 or within the processor system 602 (e.g., within a processor cache memory) during execution thereof by the computer system 600, the main memory 604 and the processor system 602 also constituting machine-readable media. The instructions 624 may be transmitted or received over a network 626, such as the network 626, via the network interface device 620.

The storage system 616 should be taken to include a single medium or multiple media (e.g., a centralized or distributed database, or associated caches and servers communicatively coupled through the network interface system 620) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 600 can include a display system 610. The display system 610 may driver firmware (or code) to enable rendering on one or more visual devices, e.g., drive a plasma display panel (PDP), a liquid crystal display (LCD), or a projector. The computer system 600 also may include one or more input/output systems 612. The input/output (IO) systems 612 may include input devices (e.g., a keyboard, mouse (or trackpad), a pen (or stylus), microphone) or output devices (e.g., a speaker). The computer system 600 also may include a network interface system 620. The network interface system 620 may include one or more network devices that are configured to communicate with an external network 626. The external network 626 may be a wired (e.g., ethernet) or wireless (e.g., WiFi, BLUETOOTH, near field communication (NFC).

The processor system 602, the memory system 604, the storage system 616, the display system 610, the IO systems 612, and the network interface system 620 are communicatively coupled via a computing bus 608.

Additional Considerations

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method of building a container for a client to run a trained large language model (LLM) comprising:

receiving the trained LLM and a desired configuration from a client device, the trained LLM including a set of weights, and the desired configuration including a cost threshold and an indication of whether a hardware configuration should be batch optimized or latency optimized;

selecting the hardware configuration based on the desired configuration from a set of hardware configurations;

structuring the set of weights of the trained LLM based on the hardware configuration by splitting the set of weights into a plurality of weight files corresponding to a plurality of graphics processing units (GPUs) of the hardware configuration, wherein each weight file of the plurality of weight files is individually loadable into a respective GPU of the plurality of GPUs;

generating a container image reflecting the hardware configuration, the container image configured to allocate the plurality of GPUs to an instance of the container image;

registering the container image to a container registry;

generating the container from the container image to deploy the trained LLM in the container;

generating an application programming interface (API) endpoint for the container; and deploying the trained LLM in the API endpoint using the container, the trained LLM accessible through API calls.

2. The method of claim 1, wherein structuring the set of weights of the trained LLM comprises splitting the weights using tensor parallelism.

3. The method of claim 1, wherein selecting the hardware configuration comprises selecting the hardware configuration based on a queries per second (QPS) of the trained LLM.

4. The method of claim 1, further comprising selecting a batching configuration for the trained LLM.

5. The method of claim 1, further comprising quantizing the trained LLM.

6. The method of claim 1, wherein selecting the hardware configuration comprises:

determining a particular hardware configuration in a hardware configuration table that has a highest throughput for a model type of the trained LLM;

computing an expected price per hour of the determined particular hardware configuration; and comparing the expected price per hour to a cost threshold.

7. The method of claim 1, wherein selecting the hardware configuration comprises determining a particular hardware configuration in a hardware configuration table that has a lowest latency for a model type of the trained LLM and has an expected price per hour that does not exceed a cost threshold.

8. The method of claim 7, wherein determining the hardware configuration in the hardware configuration table that has the lowest latency for the model type of the trained LLM comprises simulating an expected latency of at least one hardware configuration.

9. A non-transitory computer readable storage medium comprising stored program code, the program code comprising instructions, the instructions when executed cause a processor system to:

receive a trained LLM and a desired configuration from a client device, the trained LLM including a set of weights, and the desired configuration including a cost threshold and an indication of whether a hardware configuration should be batch optimized or latency optimized;

select the hardware configuration based on the desired configuration from a set of hardware configurations;

structure the set of weights of the trained LLM based on the hardware configuration by splitting the set of weights into a plurality of weight files corresponding to a plurality of graphics processing units (GPUs) of the hardware configuration, wherein each weight file of the plurality of weight files is individually loadable into a respective GPU of the plurality of GPUs;

generate a container image reflecting the hardware configuration, the container image configured to allocate the plurality of GPUs to an instance of the container image, and register the container image to a container registry;

generate a container from the container image to deploy the trained LLM in the container;

generate an application programming interface (API) endpoint for the container; and deploy the trained LLM in the API endpoint using the container, the trained LLM accessible through API calls.

10. The non-transitory computer readable storage medium of claim 9, wherein the instructions for structuring the set of weights of the trained LLM comprise instructions that, when executed, cause the processor system to split the weights using tensor parallelism.

11. The non-transitory computer readable storage medium of claim 9, wherein the instructions for selecting the hardware configuration comprise instructions that, when executed, cause the processor system to select the hardware configuration based on a queries per second (QPS) of the trained LLM.

12. The non-transitory computer readable storage medium of claim 9, wherein the instructions further comprise instructions that, when executed, cause the processor system to select a batching configuration for the trained LLM.

13. The non-transitory computer readable storage medium of claim 9, wherein the instructions further comprise instructions that, when executed, cause the processor system to quantize the trained LLM.

14. The non-transitory computer readable storage medium of claim 9, wherein the instructions for selecting the hardware configuration comprise instructions that, when executed, cause the processor system to:

determine a particular hardware configuration in a hardware configuration table that has a highest throughput for a model type of the trained LLM; and compute an expected price per hour of the determined particular hardware configuration;

compare the expected price per hour to a cost threshold.

15. A computer system, comprising:

a computer processor; and a non-transitory computer readable storage medium comprising stored instructions that when executed by the computer processor, cause the computer system to:

receive a trained LLM and a desired configuration from a client device, the trained LLM including a set of weights, and the desired configuration including a cost threshold and an indication of whether a hardware configuration should be batch optimized or latency optimized;

select the hardware configuration based on the desired configuration from a set of hardware configurations;

structure the set of weights of the trained LLM based on the hardware configuration by splitting the set of weights into a plurality of weight files corresponding to a plurality of graphical processing units (GPUs) of the hardware configuration, wherein each weight file of the plurality of weight files is individually loadable into a respective GPU of the plurality of GPUs;

generate a container image reflecting the hardware configuration, the container image configured to allocate the plurality of GPUs to an instance of the container image, and registering the container image to a container registry;

generate a container from the container image to deploy the trained LLM in the container;

generate an application programming interface (API) endpoint for the container; and deploy the trained LLM in the API endpoint using the container, the trained LLM accessible through API calls.

16. The computer system of claim 15, wherein the instructions for structuring the set of weights of the trained LLM comprise instructions causing the computer system to split the weights using tensor parallelism.

17. The computer system of claim 15, wherein the instructions for selecting the hardware configuration comprise instructions causing the computer system to select a hardware configuration based on a queries per second (QPS) of the trained LLM.

18. The non-transitory computer readable storage medium of claim 9, wherein the instructions for selecting the hardware configuration comprise instructions that, when executed, cause the processor system to determine a particular hardware configuration in a hardware configuration table that has a lowest latency for a model type of the trained LLM and has an expected price per hour that does not exceed a cost threshold.

19. The non-transitory computer readable storage medium of claim 18, wherein the instructions for determining the hardware configuration in the hardware configuration table that has the lowest latency for the model type of the trained LLM comprise instructions that, when executed, cause the processor system to simulate an expected latency of at least one hardware configuration.

20. The computer system of claim 15, wherein the instructions further comprise instructions causing the computer system to select a batching configuration for the trained LLM.

* * * * *